United States Patent
Lehtinen et al.

(10) Patent No.: US 8,557,881 B2
(45) Date of Patent: Oct. 15, 2013

(54) WOOD COMPOSITE MATERIAL AND METHOD FOR MAKING SAME

(75) Inventors: Liisa Lehtinen, Lahti (FI); Markku Koivisto, Kauniainen (FI); Jari Nisula, Lahti (FI)

(73) Assignee: UPM-Kymmene Oyj, Helsinki (FI)

( * ) Notice: Subject to any disclaimer, the term of this patent is extended or adjusted under 35 U.S.C. 154(b) by 399 days.

(21) Appl. No.: 12/446,028

(22) PCT Filed: Sep. 25, 2007

(86) PCT No.: PCT/FI2007/050516
§ 371 (c)(1),
(2), (4) Date: Jul. 1, 2010

(87) PCT Pub. No.: WO2008/046955
PCT Pub. Date: Apr. 27, 2008

(65) Prior Publication Data
US 2010/0267866 A1 Oct. 21, 2010

(30) Foreign Application Priority Data
Oct. 19, 2006 (FI) .................... 20060923

(51) Int. Cl.
*C08J 11/04* (2006.01)
(52) U.S. Cl.
USPC ..... 521/40; 521/40.5; 528/502 R; 528/502 C; 528/502 F; 428/326; 428/327; 428/331; 428/342; 428/343; 428/411.1; 428/425.1; 428/425.5; 428/479.3; 428/479.6; 428/537.1; 428/537.5
(58) Field of Classification Search
USPC ........... 521/40, 40.5, 41, 46, 47, 47.5, 48, 49, 521/49.8; 528/480, 502 R, 502 B, 502 C, 528/502 F, 901, 903; 428/294.1, 296.1, 428/296.4, 298.7, 311.71, 326, 327, 331, 428/342, 343, 411.1, 425.1, 425.5, 438, 428/479.3, 479.6, 537.1, 537.5
See application file for complete search history.

(56) References Cited

U.S. PATENT DOCUMENTS

| | | |
|---|---|---|
| 3,718,536 A | 2/1973 | Downs et al. |
| 4,874,095 A | 10/1989 | Warych |
| 5,505,390 A | 4/1996 | Rodgers |
| 2002/0034629 A1 | 3/2002 | Jones |
| 2004/0155127 A1 | 8/2004 | Kapper |

FOREIGN PATENT DOCUMENTS

| | | |
|---|---|---|
| CN | 1228729 A | 9/1999 |
| CN | 2618669 Y | 6/2004 |
| DE | 42 07 060 A1 | 9/1993 |
| FI | 97531 | 10/1993 |
| JP | 2000-027431 A | 1/2000 |
| JP | 2004-155980 A | 6/2004 |
| JP | 2006-240234 A | 9/2006 |
| WO | WO 98/01275 A1 | 1/1998 |
| WO | WO 0129314 * | 4/2001 |

OTHER PUBLICATIONS

Office translation of BACH (DE 4207060).*
Chinese Office Action for Chinese Patent Application No. 200780038425.X mailed Mar. 23, 2011.
Japanese Office Action for corresponding Japanese Patent Application No. 2009-532831 mailed Dec. 10, 2012.
Japanese Office Action for corresponding Japanese Patent Application No. 2009-532832 mailed Feb. 25, 2013.

* cited by examiner

*Primary Examiner* — Frances Tischler
(74) *Attorney, Agent, or Firm* — Merchant & Gould P.C.

(57) ABSTRACT

The invention relates to a wood composite material and to a method for making it. In accordance with the invention, the wood composite material is formed of adhesive laminate waste comprising adhesive material, glue and release material and having been arranged into chaff, the chaff being arranged into the wood composite material.

11 Claims, No Drawings

WOOD COMPOSITE MATERIAL AND METHOD FOR MAKING SAME

This application is a National Stage Application of PCT/FI2007/050516, filed 25 Sept. 2007, which claims benefit of Serial No. 20060923, filed 19 Oct. 2006 in Finland and which applications are incorporated herein by reference. To the extent appropriate, a claim of priority is made to each of the above disclosed applications.

FIELD OF THE INVENTION

The invention relates to a wood composite material and to a method for making wood composite material.

FIELD OF THE INVENTION

The invention relates to the wood composite material defined in the preamble of claim 1 and to the method for making wood composite material defined in the preamble of claim 9.

BACKGROUND OF THE INVENTION

Known from prior art are various extrusion methods in which plastic starting material is melted, mixed with optional additives and colorants and extruded through a die of a certain profile in order to form a product. When emerging from the die, the product is in, or close to, its final shape. From the die, the product can be lead to a calibration unit, where it is provided accurate and final dimensions, and further to a water reservoir functioning as a cooler. The product is sawed into the desired size on the production line. The starting material is most often fed into the extruder in granulate or powder form.

Also known from the prior art are different wood-plastic composite materials and methods for making them. Wood-plastic composite materials are made mainly from sawdust and plastic which are usually fed into the extrusion as granulates. The wood-based starting material as well as the plastic must therefore be first extruded in separate processes into granulates. However, it is possible to feed the starting material components into the extruder as such and make them into products. This requires the use of different kinds of force feed devices to ensure a steady feed despite the heterogeneity and low specific density of the starting material. The method is called direct feed.

Wood-plastic composites made by the extrusion method are manufactured by adding a wood-based constituent and different processing auxiliaries as fillers to the matrix plastic. The wood-based constituents used are typically sawdust but may also be wood chips or chemical pulp fibre. The share of the added wood-based constituent in the plastic composite is from 5 to 90%, varying greatly according to the application. For example, in a product intended for outdoor use, the share of the wood-based constituent is less than 50%. The plastic used is most typically polyolefin, such as PP, LDPE or HDPE, but it may alternatively be PVC, PS or some other thermoplastic polymer, or a mixture of different plastics. The plastic used may be virgin or recycled plastic.

When it is desired that the wood-based constituent added to the matrix reinforces the profile, the fibre length and shape of the added constituent must be taken into account. The sawdust used in wood-plastic composites is so shaped that it does not actually reinforce the product but instead functions merely as filler in the plastic matrix. The size of the sawdust typically used in wood-plastic composites is in the range of 40 to 60 mesh (from 250 to 425 µm), such that when it is used, some of the original length of the wood fibre is lost already at the production site of the starting material, such as a sawmill. Moreover, the starting materials of the wood-plastic composites made from sawdust are pre-processed by granulation before the actual processing. Such mechanical stress shortens the wood fibres even more, and the additional processing also impairs the properties of the matrix plastic. Additional processing also increases production costs.

Sawdust or wood chips normally require drying before the actual processing, because high moisture content in the filler weakens the quality of the manufactured product. The water vapour which is gasified in the processing produces gas bubbles to the profile, which affect the look of the product as well as its mechanical properties. The drying performed as an additional process is an unwanted step due to additional costs, but also to the risk of explosion.

The traditional wood-plastic composites have relatively high water absorbency and swelling compared to pure plastics. This is caused by hydrophilicity of the wood fibres and the relatively large surface area of the sawdust particles. It is commonly known that in a composite intended for outdoor use, the share of the wood-based constituent may not exceed 45%, being preferably less than 40%. The price of the composite is determined by the share and price of the required matrix plastic, such that demanding moisture conditions at the application site raise the price of the product considerably.

Known from prior art is also manufacture of wood composites from wood waste arranged in the form of pellets, and from recycled plastic. Known from publication U.S. Pat. No. 4,874,095 is also manufacture of wood composite materials from paper and thermoplastic material, and from publications US 20020034629 and U.S. Pat. No. 3,718,536 manufacture of wood composite material from wood- and plastic-based materials.

OBJECTIVE OF THE INVENTION

The objective of the invention is to eliminate the drawbacks referred to above. One specific objective of the invention is to disclose a new type of wood composite material and a method for making it. Another objective of the invention is to disclose a new method for processing adhesive laminate waste and a utility product produced in conjunction with the process.

SUMMARY OF THE INVENTION

The product and the method in accordance with the invention are characterized by what has been presented in the claims.

The invention is based on a wood composite material. In accordance with the invention, the wood composite material is formed of adhesive laminate waste comprising adhesive material, glue and release material and being arranged into chaff, the chaff being arranged into the wood composite material.

Furthermore, the invention is based on a method for making wood composite material. In accordance with the invention, the adhesive laminate waste arranged into chaff and comprising adhesive material, glue and release material is arranged into wood composite material, preferably without pre-granulation of the adhesive laminate material into pellets.

In one embodiment of the invention, the chaff is arranged into wood composite material by extruding, die casting, plate pressing or in a similar manner.

In this conjunction, the wood composite material refers to a combined product made from waste material obtained from the adhesive laminate industry and its buyers and comprising adhesive material, e.g. labels, surface material or the like, and glue and release material.

In one preferred embodiment, the adhesive laminate waste is formed of adhesive material onto which has been arranged a glue line, and adapted onto the glue line, to function as a protective sheet for it, is the release material that can be easily released at the application site.

In one embodiment of the invention, the glue is selected from the group consisting of dispersion glue, hot melt glue or mixtures thereof. Glues known per se can be used in the adhesive laminate.

In one embodiment of the invention, the adhesive material and/or the release material comprises a wood-based component and/or plastic- or polymer-based or other organic component.

In one embodiment of the invention, the adhesive and/or the release material is a wood fibre-based paper, paperboard or the like. In one embodiment, the adhesive and/or the release material is a fine paper, i.e. a wood-free paper, and does therefore not contain lignin. In one embodiment, the wood fibre-based paper, paperboard or the like comprises or is treated with plastic- or a polymer-based material. In one embodiment, the adhesive and/or the release material may be formed of substantially plastic- or polymer-based material.

In one embodiment of the invention, the release material comprises a silicone-based component. The release material is preferably siliconized.

In one embodiment of the invention, the adhesive laminate waste comprises additional plastic which may be virgin or recycled plastic. In accordance with the invention, the wood composite material may be made without or with the additional plastic.

In one preferred embodiment, additional plastic, e.g. polyolefin, polypropene, polyethene (HDPE, LDPE), PVC or other suitable plastic or a mixture thereof is added to the adhesive laminate waste in order to make the wood composite material. In one embodiment, the adhesive laminate waste and the additional plastic are led as one flow into the production of the wood composite material. In another embodiment, the adhesive laminate waste and the additional plastic are led as separate flows into the production of the wood composite material. The adhesive laminate waste and the additional plastic may preferably be mixed into a homogenous mixture before making the wood composite material. Alternatively, the additional plastic is led into the adhesive laminate waste in conjunction with the making of the wood composite material. In one embodiment, the amount of the added plastic is preferably less than 50%, more preferably in the range of 10 to 30%. In one embodiment, the adhesive laminate waste or some of its constituents comprise a sufficient amount of a plastic- or a polymer-based component without the addition of the additional plastic.

In one embodiment of the invention, the adhesive laminate waste comprises additives. In one embodiment of the invention, the desired and suitable additive/s are added to the adhesive laminate chaff before arranging the chaff into wood composite material, e.g. before extrusion, and/or during making of the wood composite material, e.g. during extrusion. In one embodiment, the additive used may be a coupling agent, e.g. MAPP (maleic anhydride derivative), for improving the adhesion between the adhesive laminate chaff and the polymer/plastic, talc for smoothing the surface and creating rigidity, a colorant and/or a slip agent. Also different fire retardants, anti-mildew agents, uv-stabilizers or such may be used as additives.

In one embodiment, the adhesive laminate waste comprises metal-based constituents.

In one embodiment of the invention, the mixture ratio between the adhesive laminate waste, the additional plastic and/or the additive is adjusted in the method. By changing the particle size of the adhesive laminate chaff and the amount and quality of the additional plastic, and by adding other fillers and reinforcement agents, the properties of the wood composite may be tailored to be suitable for each product application. Compared to the traditional wood-plastic composite made from sawdust in which the particle size and shape of the sawdust have a considerable impact on the mechanical properties of the composite being produced, the composite provided from the adhesive laminate waste chaff is significantly more multifunctional as to its mechanical properties. Preferably, the mechanical properties of the wood composite material, such as elasticity, water absorbency, and other mechanical properties, are adjusted by changing the particle size of the chaff and/or the amount and quality of the additional plastic.

In one preferred embodiment, the share of the adhesive laminate waste in the wood composite material is substantially more than 50%.

In one embodiment of the invention, the adhesive laminate waste is chopped and screened into chaff material of the desired particle size before making the wood composite material. In one embodiment, the particle size of the chaff to be led into production is from 1 to 10 mm. In one embodiment, the particle size of the chaff is from 3 to 5 mm.

The adhesive laminate waste may be chopped in conjunction with the method according to the invention, or it may already be in the chaff form.

Any suitable production methods known per se can be used in conjunction with this invention.

Finished adhesive laminate products and waste material produced from them or from their manufacture may be used for making the wood composite. Also production waste and recycling material from further processing and end use may be used.

In one embodiment of the invention, the adhesive laminate waste is obtained from adhesive laminate production, comprising mainly production waste, edge strip waste cut off from reels, and reel ends, from adhesive laminate press facilities, comprising mainly reel ends, adhesive material left over from die cutting stickers and labels, and waste, and/or from adhesive laminate end users who glue the pressed stickers and labels or the like onto the products. The waste obtained from the end users comprises mainly release material, reel ends and waste from the finished product. The kinds of adhesive laminate waste obtained from different steps differ in their composition and can be mixed into a suitable adhesive laminate waste mixture. In this manner, by collecting waste from different steps of the life cycle of said product, and by recycling the collected waste, the principles of recycling and sustained development can be fulfilled.

The sawdust and the wood-based constituents in the previously known wood-plastic composites comprise lignin which disintegrates due to uv-radiation, impairing the wood properties. The paper used in the adhesive laminate used in conjunction with the invention is in most cases made from chemical pulp and does therefore not comprise lignin. This makes the fibre fractions of the adhesive laminate more homogenous, stable and stronger, without the lignin. The chemical pulp fibre is also longer than the fibre material that has been ground mechanically.

The method in accordance with the invention is suitable for use in the processing of different kinds of adhesive laminate waste materials and for making wood composites. The products formed in the process can be utilized in various applications, e.g. as edge boards, reel cores, building materials, patio boards, design products or the like.

The method in accordance with the invention allows the simultaneous disposal of adhesive laminate waste and production of a utilizable product. Adhesive laminate waste cannot be utilized in normal paper recycling, due to glue, plastic, polymer, silicone and the like contained therein.

The wood composite material in accordance with the invention is extremely environmentally friendly and promotes the principle of sustained development. The invention provides a product which is itself recycling material and can be utilized as one, also meeting the ever stricter environmental regulations.

The product in accordance with the invention is weather resistant, flexible, mechanically strong, easily mouldable during manufacture, and wear resistant. The product in accordance with the invention is also easily worked and has good elastic properties. Thanks to the elastic properties, the product can easily be nailed without cracking and without the need to use pre-drilled holes.

The method in accordance with the invention is very simple, which reduces investment and processing costs.

The method in accordance with an alternative embodiment of the invention provides for making wood composition material comprising: (a) collecting adhesive laminate waste from adhesive laminate production, adhesive laminate press facilitates, adhesive laminate end users, or a combination thereof; and (b) forming the wood composite material from the adhesive laminate waste.

DETAILED DESCRIPTION OF THE INVENTION

In the following section, the invention will be described with the aid of detailed exemplary embodiments.

Example 1

A profile intended to be used as a package edge board must be strong and sufficiently elastic to be able to stand the sharp compression force caused by tightening of the package binder. With the intention of making a profile that is suitable for use as an edge board, the adhesive laminate was chopped into chaff and the chaff was screened into particle sizes of 4 and 5 mm. Both particle sizes had an equal share in the starting material flow. 10% of LDPE was added to the chaff, and the product was extruded into an L-profile at the production rate 158 kg/h, the temperature of the mass being 137° C. A test sample of 30×150×7.5 mm was sawed off from the edge board profile and bent using 3-point flexion in accordance with standard SFS-EN ISO 178. The bending strength obtained for the material was 29.3 N/mm$^2$ and the elasticity modulus was 1030 N/mm$^2$.

Example 2

Laminate reel cores must be strong and rigid in order to stand the forces applied to the reel during use and to make the laminate reels dimensionally accurate. In making the core profile, 15% of PP, 10% of talc and 3% of coupling agent was added to the adhesive laminate chaff of 3 mm. The mass plastified with an extruder was run through a core mould at the rate 140 kg/h, the temperature of the mass being 185° C. For material tests, pieces of 100 mm were sawed off from the core for testing their compressive strength in both horizontal and vertical directions at the rate 10 mm/min. The compressive strength obtained for the material was 2.9±0.1 kN in the horizontal and 78.8±1.2 kN in the vertical direction.

Example 3

A patio board intended for outdoor use must be mechanically strong and also have low water absorbency so that the moisture absorbing into the product would not cause any microbial growth, dimensional changes or other changes caused by moisture. With the intention of producing a product suitable for outdoor use, 30% of LDPE was added to the adhesive laminate chaff of 4 mm. For material tests, the product was extruded into an L-profile at the production rate 80 kg/h, the temperature of the mass being 170° C. Test samples were sawed off from the L-profile for testing their water absorbency in accordance with standard SFS-EN ISO 62. The obtained water absorbency was after 24-48-72-192-384 and 1152h 0.69-0.88-0.93-1.53-1.87 and 4.10%.

Example 4

With the intention of further improving the water absorbency of the patio board suitable for outdoor use in more demanding conditions, samples were produced in accordance with example 3, but by adding 5% of coupling agent to the above-mentioned starting materials. The water absorbency obtained for the material was after 24-48-72-192-384 and 1152 h 0.50-0.64-0.83-1.26-1.38 and 2.75%.

Example 5

In addition to low water absorbency and mechanical strength, the patio intended for outdoor use must be easily worked. A typical problem with the traditional and previously known wood composite materials is their easy cracking during nailing.

In making the patio board profile, 10% of talc, 23% of PP, and 3% of coupling agent was added to the adhesive laminate chaff. The material was extruded at the rate 120 kg/h, the temperature of the mass being 175° C. The produced patio board was tested using 3-point flexion in accordance with standard EN 310, the obtained bending strength being 13.5 N/mm$^2$. The produced board is easily worked and fastened because it can be accurately sawed even into complex shapes and it may be nailed up or screwed, when desired, without the risk of cracking of the board.

In summary, the tests show that the material based on the adhesive laminate provided easily utilizable wood composite products, which could be easily equipped with the desired properties, e.g. strength, stability, elasticity, resilience and workability, for various applications. It was observed that the properties of the provided products met the criteria required in each application.

The method in accordance with the invention is suitable, in different embodiments, for use in the manufacture of different kinds of wood composites and in the processing of adhesive laminate waste.

The embodiments of the invention are not limited to the examples referred to above; instead many variations are possible within the scope of the accompanying claims.

The invention claimed is:

1. A wood composite material comprising recycled adhesive laminate waste arranged into chaff and a polymer material, wherein the adhesive laminate waste comprises: adhesive material, glue, and release material, wherein the release material comprises a silicone-based agent, and the adhesive laminate waste is obtained from adhesive laminate production, adhesive laminate press facilities or adhesive laminate end users.

2. The wood composite material in accordance with claim 1, wherein the adhesive material, the release material, or both the adhesive material and the release material comprises a component based on wood fibres and a plastic- or a polymer-based or other organic component.

3. The wood composite material in accordance with claim 1, wherein the adhesive material and the release material is a paper based on wood fibres.

4. The wood composite material in accordance with claim 3, wherein the adhesive material and the release material is a fine paper.

5. The wood composite material in accordance with claim 1, wherein the adhesive laminate waste comprises additional plastic.

6. The wood composite material in accordance with claim 1, wherein the adhesive laminate waste comprises additives.

7. The wood composite material in accordance with claim 1, wherein wood composite material is formed by extruding, die casting, or plate pressing the chaff and the polymer material.

8. The wood composite material in accordance with claim 1, wherein the recycled adhesive laminate waste is extruded with the polymer material.

9. The wood composite material in accordance with claim 1, wherein the polymer material is a polyolefin.

10. The wood composite material in accordance with claim 9, wherein the polyolefin is selected from the group consisting of polypropylene, low density polyethylene, high density polyethylene, and mixtures thereof.

11. The wood composite material in accordance with claim 1, wherein the polymer material is a polyvinylchloride or polystyrene.

* * * * *